(12) United States Patent
Pastouchenko et al.

(10) Patent No.: US 12,339,002 B2
(45) Date of Patent: Jun. 24, 2025

(54) PROPULSION SYSTEM FOR JET NOISE REDUCTION

(71) Applicant: General Electric Company, Schenectady, NY (US)

(72) Inventors: Nikolai N. Pastouchenko, Latham, NY (US); Umesh Paliath, Clifton Park, NY (US); Changjin Yoon, Schenectady, NY (US); Jason A. Lee, Loveland, OH (US); David Andrew Perveiler, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/732,888

(22) Filed: Apr. 29, 2022

(65) Prior Publication Data
US 2023/0349555 A1    Nov. 2, 2023

(51) Int. Cl.
*F23R 3/20* (2006.01)
*F02K 3/10* (2006.01)

(52) U.S. Cl.
CPC .................. *F23R 3/20* (2013.01); *F02K 3/10* (2013.01); *F05D 2220/323* (2013.01); *F05D 2240/35* (2013.01); *F05D 2260/96* (2013.01)

(58) Field of Classification Search
CPC ... F02K 3/10; F02K 3/105; F02K 3/11; F02K 1/827; F23R 3/18; F23R 3/20; F23R 3/34
See application file for complete search history.

(56) References Cited

U.S. PATENT DOCUMENTS

| 3,698,186 A * | 10/1972 | Beane | F23R 3/00 60/764 |
| 4,720,971 A * | 1/1988 | DuBell | F02C 3/14 60/761 |
| 5,095,696 A * | 3/1992 | Gulati | F23R 3/18 60/749 |
| 5,212,945 A * | 5/1993 | Habrard | F23R 3/22 60/226.3 |
| 5,367,873 A * | 11/1994 | Barcza | F23R 3/18 60/749 |
| 6,691,515 B2 | 2/2004 | Verdouw et al. | |
| 6,773,257 B2 | 8/2004 | Paschereit et al. | |
| 6,880,340 B2 | 4/2005 | Saitoh | |
| 7,552,796 B2 | 6/2009 | Baarck et al. | |
| 7,603,862 B2 * | 10/2009 | Steele | F23R 3/34 60/725 |
| 7,810,335 B2 * | 10/2010 | Dussillols | F02K 1/383 60/770 |
| 8,037,688 B2 * | 10/2011 | Hagen | F23R 3/50 60/739 |
| 8,516,819 B2 | 8/2013 | Gambacorta et al. | |
| 8,678,301 B2 | 3/2014 | Hubbard | |
| 9,140,214 B2 * | 9/2015 | Stern | F02K 3/10 |

(Continued)

*Primary Examiner* — Alain Chau
(74) *Attorney, Agent, or Firm* — Dority & Manning, P.A.

(57) ABSTRACT

A propulsion system is provided, wherein the propulsion system includes an afterburner assembly. The afterburner assembly including: an exhaust section and a fuel injector assembly that is operable to inject fuel in the exhaust section. The fuel injector assembly includes a plurality of fuel injection members. The plurality of fuel injection members defines a hot zone and a cold zone. The cold zone is positioned to provide a noise insulation barrier for the hot zone.

9 Claims, 10 Drawing Sheets

(56) References Cited

U.S. PATENT DOCUMENTS

| | | |
|---|---|---|
| 9,310,072 B2 | 4/2016 | Ainslie |
| 9,546,601 B2 | 1/2017 | Kim et al. |
| 10,323,574 B2 | 6/2019 | Tonon et al. |
| 11,041,625 B2 | 6/2021 | Purcell et al. |
| 2005/0257527 A1* | 11/2005 | Baboeuf .................. F02K 1/386 60/722 |
| 2006/0080962 A1* | 4/2006 | Steele ....................... F23R 3/34 60/761 |
| 2007/0163230 A1* | 7/2007 | Dussillols ................. F02K 1/36 60/770 |
| 2007/0227152 A1* | 10/2007 | Bunel ....................... F02K 3/10 60/761 |
| 2008/0072605 A1* | 3/2008 | Hagen ................. F23M 20/005 60/776 |
| 2010/0101208 A1* | 4/2010 | Lovett ....................... F23R 3/20 60/761 |
| 2013/0219855 A1* | 8/2013 | Stern ......................... F02K 3/10 60/761 |
| 2021/0356127 A1* | 11/2021 | Yeandel .................. F23R 3/283 |

* cited by examiner

PROPULSION SYSTEM FOR JET NOISE REDUCTION

FIELD

The present disclosure relates to an afterburner assembly for a propulsion system and a method for operating the same.

BACKGROUND

At least some known aircraft propulsion systems include a compressor, a combustor, a turbine, and an afterburner assembly or augmentor. Airflow entering the compressor is compressed and directed to the combustor where it is mixed with fuel and ignited, producing hot combustion gases used to drive the turbine. Afterburner assemblies are used in gas turbine engines to increase thrust as needed in a flight envelope and are located downstream from the turbomachinery. Additional thrust is produced within the afterburner assembly when oxygen contained within both the core gas flow and the bypass air of the engine is mixed with fuel and burned.

During take-off of the aircraft, the afterburner assembly may generate a relatively large amount of noise. The large amount of noise generated can result in undesirable ground noise. Improvements to an afterburner assembly to reduce an amount of noise generated would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
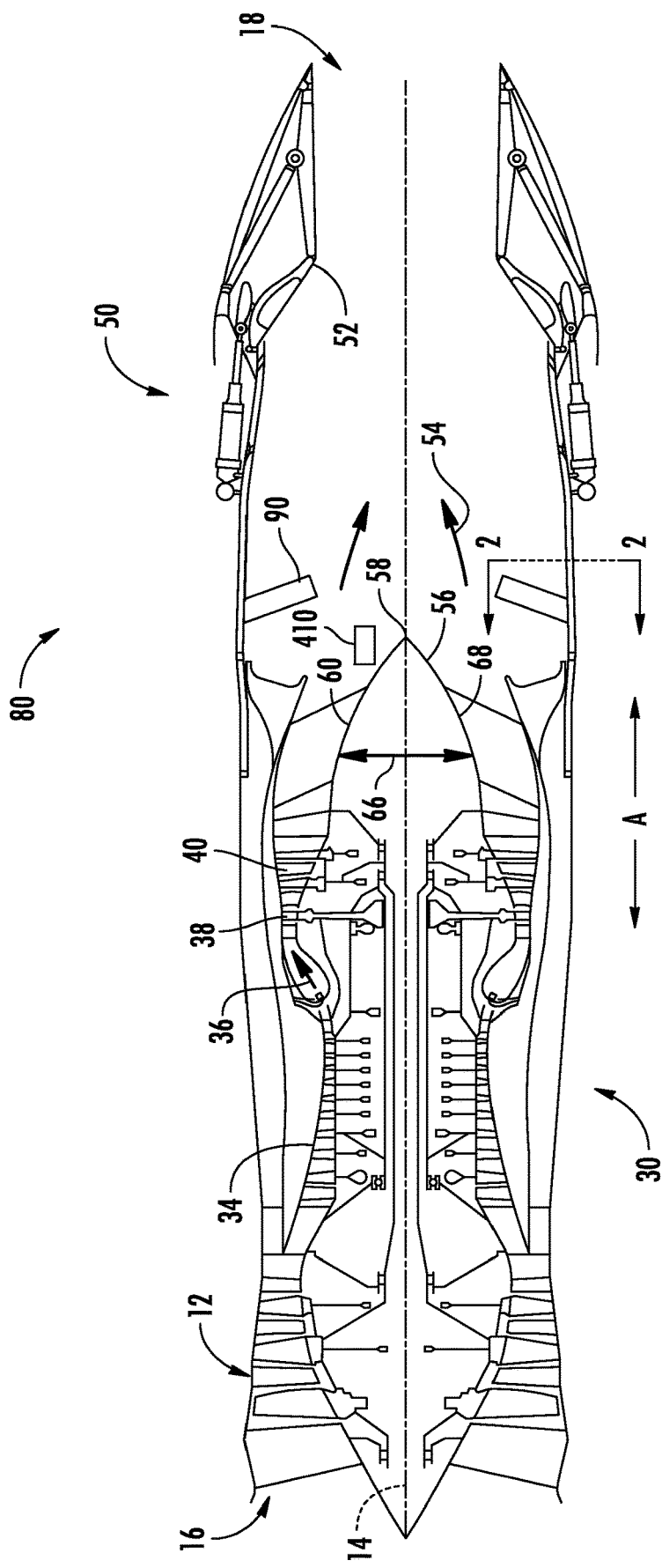
FIG. 1 is a cross-sectional schematic view of gas turbine engine having an afterburner assembly in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first" and "second" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The present disclosure is generally related to an afterburner assembly of a propulsion system configured to reduce the amount of external noise generated by the afterburner assembly. During an operating condition of the propulsion system, the afterburner assembly may be activated to temporarily increase thrust of the propulsion system. The activation of the afterburner assembly may significantly increase the amount of external noise generated. The inventors of the present disclosure have found that with modifications to the afterburner assembly and a method of operating the afterburner assembly, a reduction of external noise generated by the afterburner assembly can be achieved.

A propulsion system is provided. The propulsion system includes an afterburner assembly. The afterburner assembly includes an exhaust section and a fuel injector assembly. Further, the fuel injector assembly includes a plurality of fuel injection members and a flame stability device. The plurality of fuel injection members are operable to inject fuel in the exhaust section of the afterburner assembly. Moreover, the plurality of fuel injection members defines a cold zone and a hot zone. The cold zone is positioned to provide a noise insulation barrier to the hot zone.

For example, in one embodiment, the plurality of fuel injection members may include a first set of fuel nozzles and a second set of fuel nozzles. The first set of fuel nozzles may be disposed in the cold zone and the second set of the fuel nozzle may be disposed in the hot zone. Further, the fuel injector assembly may be operable to control the first set of fuel nozzles relative to the second set of fuel nozzles. Additionally, the fuel injector assembly may include a flame stability device positioned downstream of the plurality of fuel injection members. The flame stability device may be configured to assist in maintaining continual combustion within the exhaust section.

Aspects of the present disclosure further present a method of operating an afterburner assembly of a propulsion system. The method includes operating the afterburner assembly to start-up the afterburner assembly. The method further includes injecting fuel of a fuel injector assembly in an exhaust section of the afterburner assembly. For example, a plurality of fuel injection members of a fuel injector assembly is configured to inject fuel of the fuel injector assembly into the exhaust section of the afterburner assembly while operating the afterburner assembly to start-up the afterburner assembly. Also disclosed is a means of modifying a fuel injection rate of the fuel injectors.

The afterburner assembly of the present disclosure may augment previously employed afterburner assemblies. As will be discussed in more detail below, the afterburner assembly may advantageously reduce the external noise produced while maintaining performance of the propulsion system. Benefits of the disclosed method include reduced noise generation of the afterburner assembly.

Referring now to the drawings, wherein identical numerals indicate the same elements throughout the figures, FIG. 1 is a schematic cross-sectional view of a propulsion system in accordance with an exemplary embodiment of the present disclosure. More particularly, for the embodiment of FIG. 1, the propulsion system is an afterburning turbofan jet engine, referred to herein as a "turbofan engine 10." The turbofan engine 10 includes a fan assembly 12, a turbomachine 30 disposed downstream from the fan assembly 12, and an afterburner assembly 80 disposed downstream of the turbomachine 30. The turbofan engine 10 has a generally longitudinally extending axis or centerline 14 extending from an inlet end 16 of the turbofan engine 10 aftward to an exhaust end 18 of the turbofan engine 10. Moreover, the turbomachine 30 defines an axial direction A (extending parallel to the engine centerline 14, provided for reference). Further, the turbofan engine 10 defines a crosswise plane perpendicular to the axial direction A.

The exemplary turbomachine 30 includes a high pressure compressor 34, a combustor 36, a high pressure turbine 38, and a power turbine or a low pressure turbine 40, all arranged in a serial, axial flow relationship.

For the embodiment depicted, the afterburner assembly 80 includes an exhaust section 50 and a fuel injector assembly 90. The exhaust section 50 of the afterburner assembly 80 extends aftward from the turbomachine 30 and includes a nozzle portion 52. The nozzle portion 52 extends between the exhaust section 50 and the turbomachine 30 and defines a portion of an outer boundary of an engine exhaust flowpath 54. The fuel injector assembly 90 includes a plurality of fuel injection members 92 (depicted in FIG. 2) and a flame stability device 97 (depicted in FIG. 2) positioned downstream of the plurality of fuel injection members 92. The plurality of fuel injection members 92 extends inwardly from the nozzle portion 52 and inject fuel in the exhaust section 50. Additionally, the flame stability device 97 extends inwardly from the nozzle portion 52 and is configured to assist in maintaining continual combustion within the exhaust section 50.

More specifically during operation, the nozzle portion 52 directs combustion gases discharged from the turbomachine 30 through exhaust section 50 of the afterburner assembly 80 wherein the fuel injected in the exhaust section 50 is mixed with and ignited by the combustion gases. The flame stability device 97 maintains the flame by producing a low speed eddy in the exhaust section 50. Such mixing and ignition produces additional thrust and external noise for the propulsion system.

A centerbody 56 extends aftward from turbomachine 30 to an apex 58 formed at an aft end 60 of the centerbody 56. More specifically, the centerbody 56 is concentrically aligned with respect to the exhaust section 50 and extends aftward along engine centerline 14. An outer surface of centerbody 56 defines an inner boundary of engine exhaust flowpath 54.

During operation, airflow enters the turbofan engine 10 through fan assembly 12. The air is compressed, and a portion of the air is discharged downstream at an increased pressure and temperature to the high-pressure compressor 34. Fuel is introduced to the turbomachine 30 wherein the air and the fuel are mixed and ignited within the turbomachine 30 to generate hot combustion gases. Specifically, pressurized air from the high pressure compressor 34 is mixed with the fuel in the combustor 36 and ignited, thereby generating combustion gases. Such combustion gases drive the high pressure turbine 38 which drives the high pressure compressor 34. The combustion gases are discharged from the high pressure turbine 38 into the low pressure turbine 40. The core airflow and combustion gases are then discharged from low pressure turbine 40 and directed towards the afterburner assembly 80.

Figure 2:
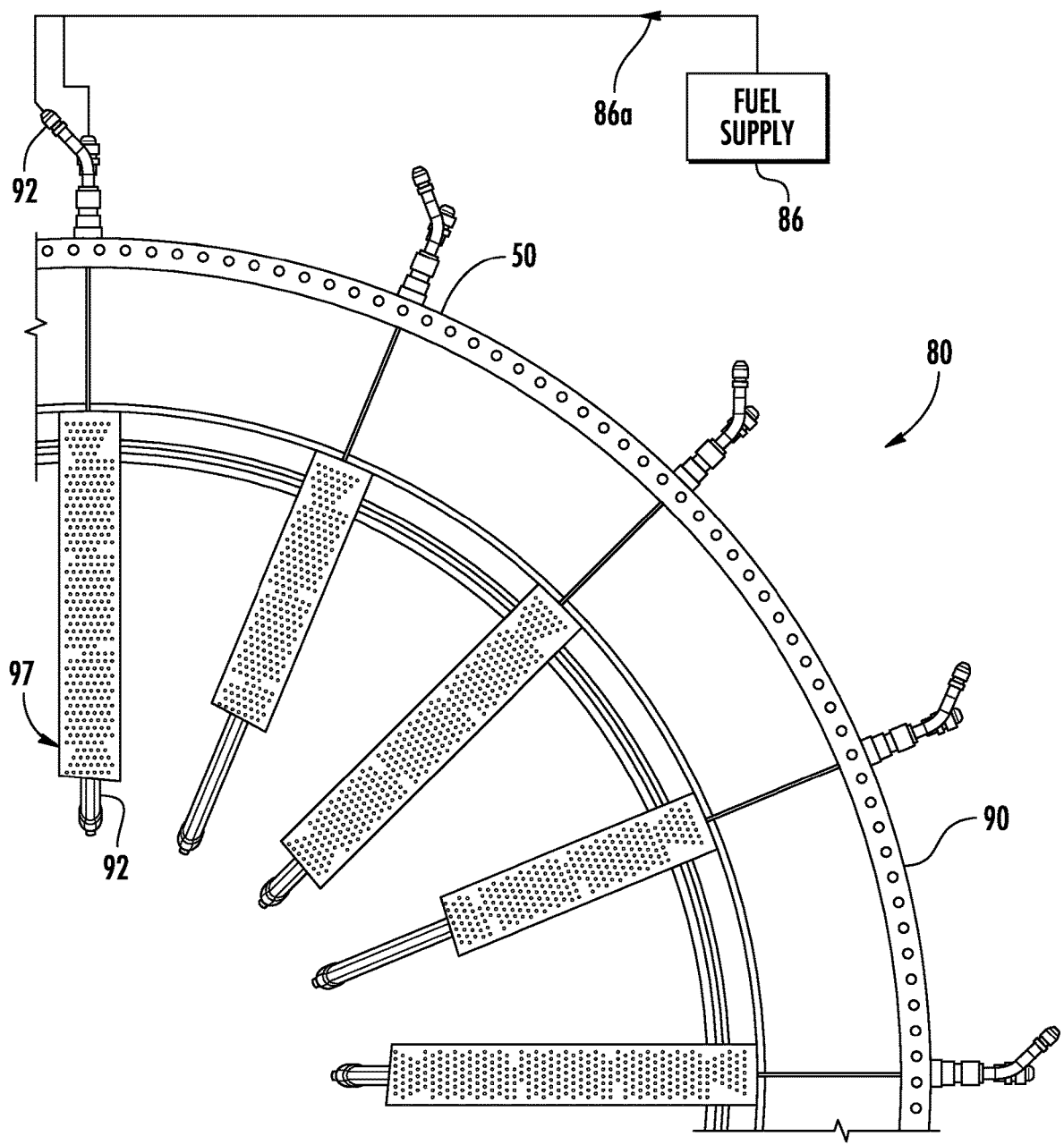
FIG. 2 is an aft-facing-forward radial elevational view of a portion of the afterburner assembly in FIG. 1 and taken along line 2-2.
Figure 3:
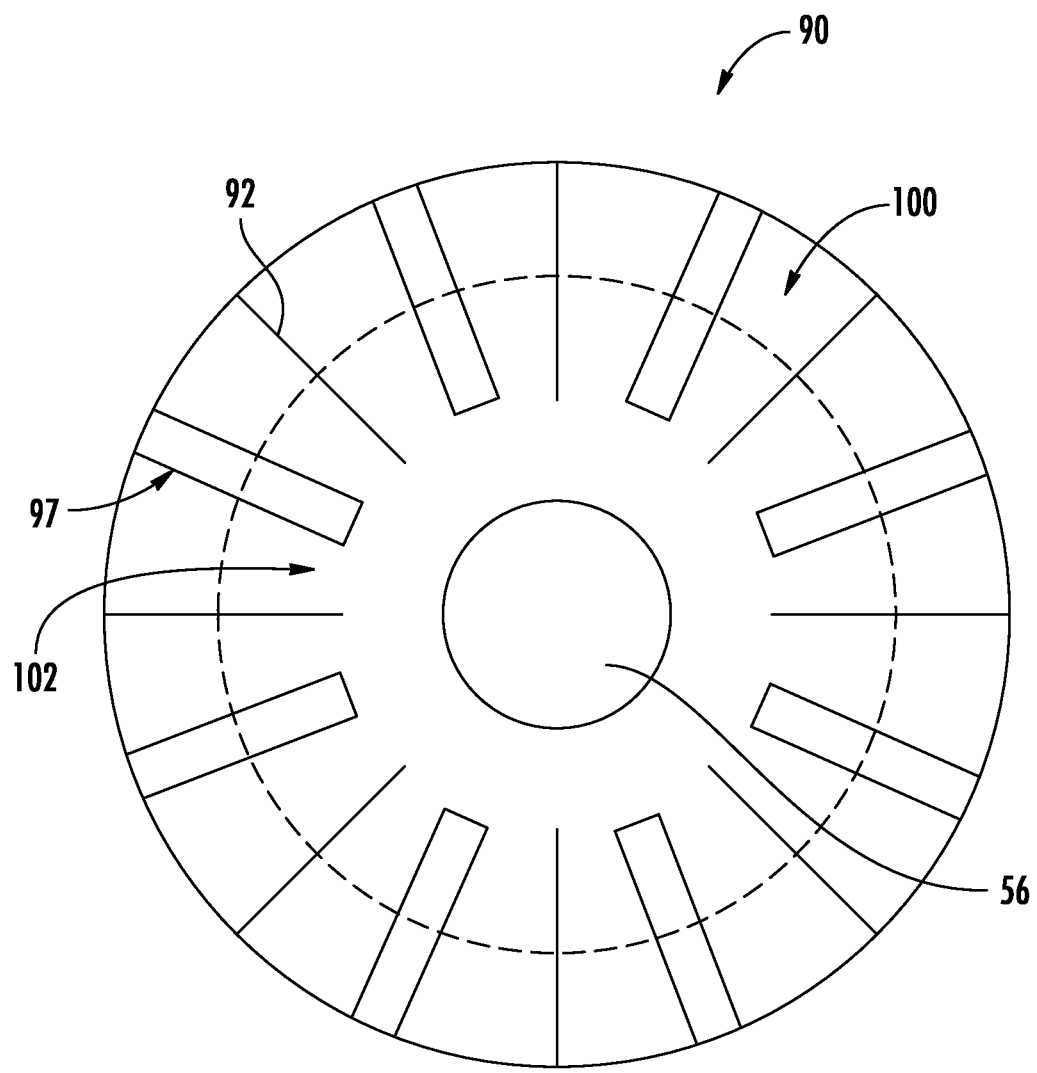
FIG. 3 is a simplified schematic view of a cold zone and a hot zone of the afterburner assembly in accordance with an exemplary embodiment of the present disclosure.

Referring now to FIG. 2, an aft-facing-forward radial elevational view of a portion of the afterburner assembly 80 is provided. The exemplary afterburner assembly 80 depicted in FIG. 2 includes the fuel injector assembly 90 in accordance with an exemplary embodiment of the present disclosure. The fuel injector assembly 90 includes the plurality of fuel injection members 92 and the flame stability device 97. The plurality of fuel injection members 92 are spaced circumferentially apart and extend inwardly from the nozzle portion 52. Further, the plurality of fuel injection members 92 define a cold zone 100 and a hot zone 102, as illustrated in FIG. 3. The cold zone 100 and the hot zone 102 are defined in the crosswise plane of the propulsion system. As will be discussed in greater detail with reference to the exemplary embodiments below, the cold zone 100 is positioned to provide a noise cancellation barrier for the hot zone 102.

Additionally, the plurality of fuel injection members 92 are suitably joined in flow communication with a fuel supply 86. The fuel supply 86 is effective for channeling fuel 86a to each of the fuel injection members 92 into the exhaust section 50 (FIG. 1) of the afterburner assembly 80. The flame stability device 97 provides enhanced performance of the afterburner assembly 80 in accordance with the present embodiment while improving durability and effective life thereof. The flame stability device 97 may improve a flame holding capability, efficiency, and performance.

It will be appreciated that the exemplary fuel injector assembly 90 is provided by way of example only, and that in other exemplary embodiments any other suitable fuel injector assembly 90 may be provided.

Figure 4:
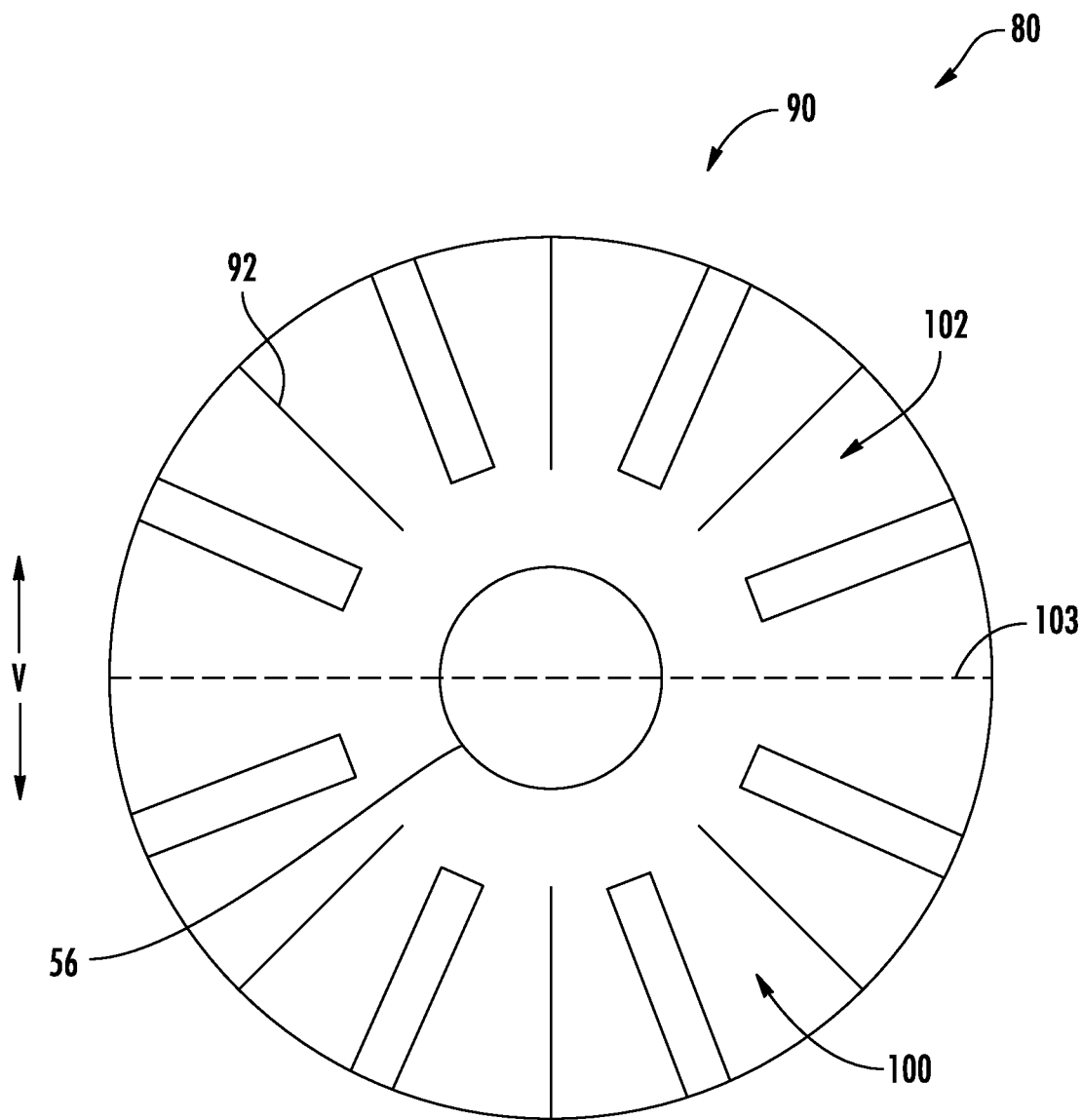
FIG. 4 is a simplified schematic view of the cold zone and the hot zone of the afterburner assembly in accordance with another exemplary embodiment of the present disclosure.

Referring now to FIGS. 3 and 4, simplified schematic views of the afterburner assembly 80 in accordance with alternative exemplary aspects of the present disclosure are provided. The exemplary afterburner assemblies 80 may be configured in substantially the same manner as the exemplary afterburner assembly 80 of FIG. 2, and accordingly, the same or similar numbers may refer to same or similar parts.

For example, the exemplary afterburner assemblies 80 of FIGS. 3 and 4 generally includes fuel injector assembly 90. The fuel injector assembly includes a plurality of fuel injection members 92 and a flame stability device 97. The plurality of fuel injection members 92 define a cold zone 100 and a hot zone 102.

Referring particularly to the embodiment of FIG. 3, the cold zone 100 is defined radially outward of the hot zone 102 to provide a noise insulation barrier for the hot zone 102. In particular, for the embodiment of FIG. 3, the cold zone 100 is an annular zone e.g., extending a total of 360 degrees about the hot zone 102. Further, in the exemplary aspect depicted, the cold zone 100 is at least an outside 5% of a radius in the crosswise plane depicted. For example, the cold zone 100 may further be at least an outside 25% of a radius in the crosswise plane, such as at least 30%, such as at least 40%, such as up to 70%, and such as up to 60%.

Inclusion of an afterburner assembly in accordance with such a configuration may reduce the noise produced by the afterburner assembly during an operating condition of the gas turbine engine e.g., the cold zone 100 may radially shield the noise generated by the hot zone 102 during the operating condition of the propulsion system.

By contrast, referring now particularly to the embodiment of FIG. 4 the hot zone 102 is defined above the cold zone 100 relative to a centerline 103. More specifically, the hot zone 102 is above the cold zone 100 in a vertical direction V. The vertical direction V is defined by the afterburner assembly 80 and corresponds to a vertical direction when the afterburner assembly 80 is in a normal operational attitude (e.g., during a steady state cruise operation). The centerline 103 is positioned at a midpoint of the afterburner assembly 80 along the vertical direction V. The cold zone 100 provides a noise insulation barrier for the hot zone 102 e.g., the cold zone 100 may be positioned to provide a noise insulation barrier for the hot zone 102 so that the ground noise generated by the afterburner assembly 80 is reduced. In particular, for the embodiment of FIG. 3, the cold zone 100 is at least the bottom 5% of the afterburner assembly 80. For example, the cold zone 100 may further be at least the bottom 25% of the afterburner assembly 80, such as at least 40%, such as at least 50%, such as up to 80%, and such as up to 60%.

Inclusion of an afterburner assembly in accordance with such a configuration may reduce the noise produced by the afterburner assembly during an operating condition of the gas turbine engine e.g., the cold zone 100 may vertically shield the noise produced by the hot zone 102 during the operating conditions of the propulsion system. It should be appreciated however, that in other exemplary embodiments of the present disclosure, the plurality of fuel injection members 92 may additionally or alternatively define any suitable configuration of the cold zone 100 and the hot zone 102 to reduce the external noise produced by the afterburner assembly 80.

Further, it will be appreciated that the terms "hot zone" and "cold zone" are relative terms not meant to imply any absolute temperature ranges, and instead meant to imply relative temperature ranges in order to provide the benefits described herein above. For example, the afterburner assembly 80 may define a first average temperature within the cold zone 100 during the operating condition of the propulsion system. Additionally, the fuel injector assembly 90 may define a second average temperature within the hot zone 102 during the operating condition of the propulsion system. The first average temperature may be at least 10% lower than the second average temperature. For example, the first average temperature may be at least 20% lower than the second average temperature, such as at least 40%, such as up to 70%, such as up to 60%. The operating condition of the propulsion system may be a takeoff operation condition or a climb operating condition.

Figure 5:
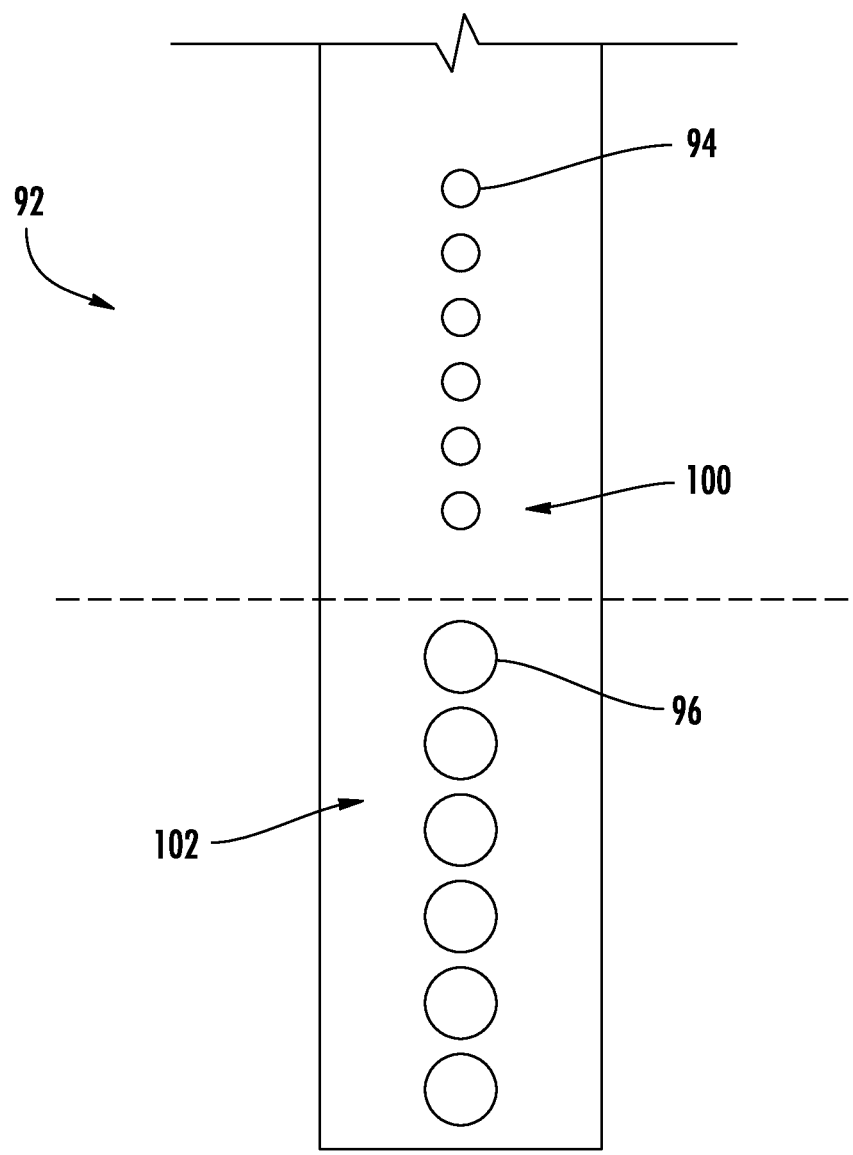
FIG. 5 is a simplified schematic view of a fuel injection member in accordance with an exemplary embodiment of the present disclosure.

Referring now to FIG. 5, a close-up, schematic view of a fuel injection member 92 of the fuel injector assembly 90 of FIG. 3 is provided. The exemplary fuel injection member 92 is a fuel spray bar. The fuel injection member 92 is operable to inject fuel in the exhaust section 50 of the afterburner assembly 80 (See FIG. 1). The fuel injection member 92 is configured to define a cold zone 100 and a hot zone 102. More specifically, the fuel injection member 92 includes a first set of fuel nozzles 94 and a second set of fuel nozzles 96. The first set of fuel nozzles 94 is disposed in the cold zone 100 and the second set of fuel nozzles 96 is disposed in the hot zone 102. More specifically, in the exemplary embodiment of FIG. 5, the second set of fuel nozzles 96 are relatively larger than the first set of fuel nozzles 94. The larger second set of fuel nozzles 96 therefore allows a larger volume of fuel to flow through relative to the smaller first set of fuel nozzles 94, such that more energy is inputted into the combustion gasses from the second set of fuel nozzles 96 as compared to the first set of fuel nozzles 94, such that the fuel injection member 92 generates higher temperature combustion gasses within the hot zone 102 as compared to within the cold zone 100.

During operation, the fuel injection member 92 injects fuel through the first set of fuel nozzles 94 in the cold zone 100 and through the second set of fuel nozzles 96 in the hot zone 102. The first set of fuel nozzles 94 inject fuel to define the cold zone 100 and the second set of fuel nozzles 96 inject fuel to define the hot zone 102. The cold zone 100 may have a first average temperature that is at least 10% lower than the hot zone 102 having a second average temperature. The first average temperature of the cold zone 100 provides a noise insulation barrier to the second average temperature of the hot zone 102.

The noise insulation barrier results in a reduction of external noise produced by the afterburner assembly 80. Generally, during operation a relatively high velocity of air exits the exhaust end 18 of the turbofan engine 10 (See FIG. 1). Mixing of this high velocity of air with ambient air that surrounds the turbofan engine 10 may create turbulence that may, in turn, generate an undesirable amount of noise. In general, in the context of the exhaust gasses through the exhaust end 18 of the turbofan engine 10, colder air travels at a lower speed than hotter air as a result of less energy being provided to the colder air. In the exemplary embodiment depicted, the cold zone 100 therefore produces a first velocity of air that exits the exhaust end 18 and the hot zone 102 produces a second velocity of air that exits the exhaust end 18. The first velocity of air is relatively lower than the second velocity of air. In such a manner, during operation, the first velocity of air exiting the exhaust section 18 has a lower speed delta with the ambient air (as compared to the second velocity of air) and therefore creates a lower amount of turbulence and noise.

It should be appreciated however, that in other exemplary embodiments of the present disclosure, the fuel injection member 92 may additionally or alternatively include any other suitable configuration.

Figure 6:
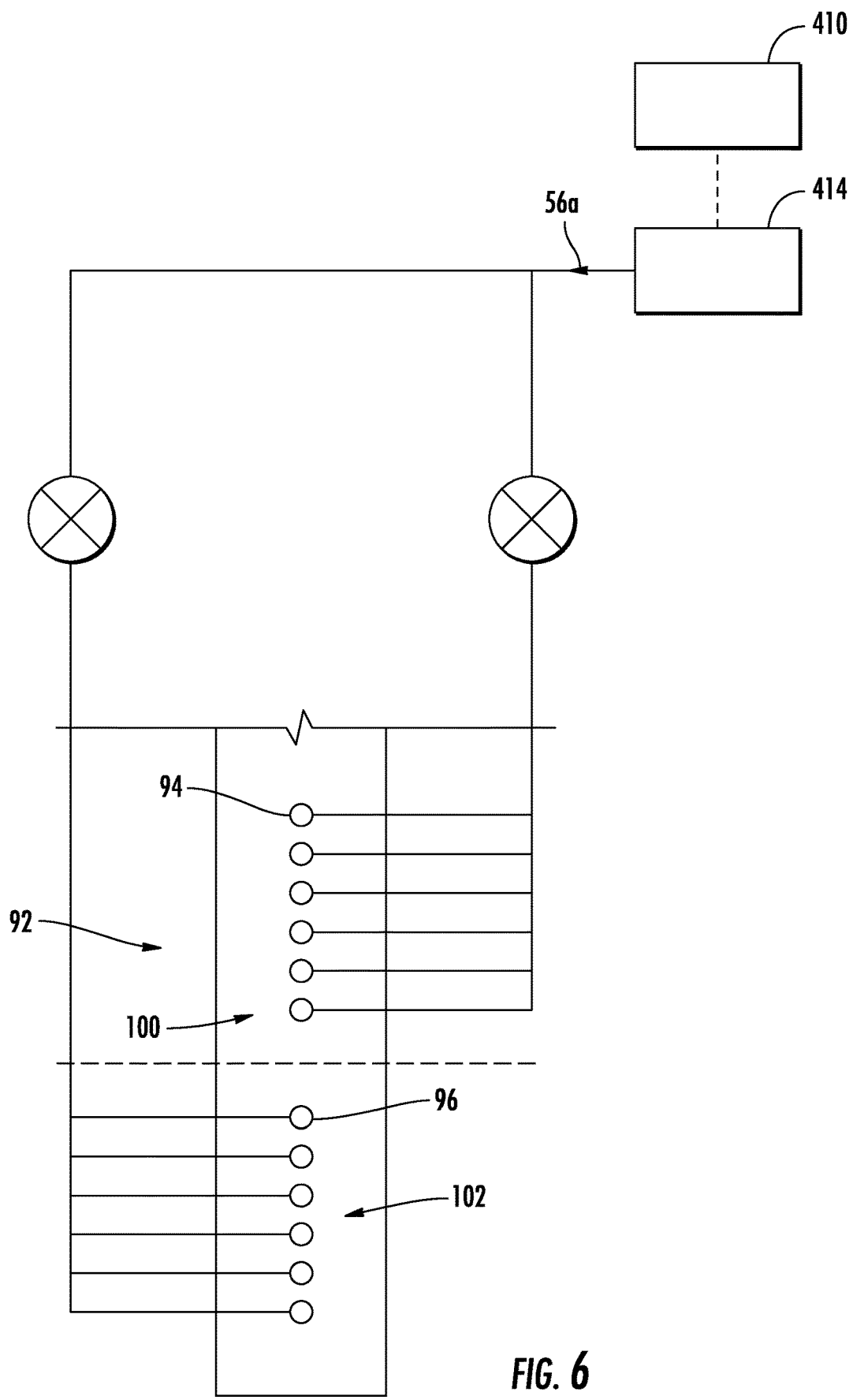
FIG. 6 is a simplified schematic of a fuel injection member in accordance with another exemplary embodiment of the present disclosure.

For example, referring now to FIG. 6, a close-up, schematic view of a fuel injection member 92 in accordance with another exemplary aspect of the present disclosure is provided. The exemplary fuel injection member 92 of FIG. 6 is configured in substantially the same manner as the exemplary fuel injection member 92 of FIG. 5, and accordingly, the same or similar numbers may refer to the same or similar parts.

For example, the exemplary fuel injection member of FIG. 6 generally includes a first set of fuel nozzles 94 and a second set of fuel nozzles 96. However, for the embodiment of FIG. 6 the fuel injection member 92 further includes a fuel regulator 414 operable to modify the injection rate of the fuel injection member 92. The fuel regulator 414 is more specifically in fluid communication with the first set of fuel nozzles 94 and the second set of fuel nozzles 96, and/or configured to channel a fuel 56a to the first set of fuel nozzles 94 and the second set of fuel nozzles 96. For example, the fuel regulator 414 may channel fuel 56a through the first set of fuel nozzles 94 to define the cold zone 100 and channel fuel 56a through the second set of fuel nozzles 96 to define the hot zone 102.

It will be appreciated that the afterburner assembly 80 further includes a computing device or controller 410 operable with certain aspects of the afterburner assembly 80 for controlling various aspects of the fuel injection member 92. The computing device 410 may be part of the control system 400 described below with reference to FIG. 10. In such a manner, it will be appreciated that the depicted fuel injection member 92 further includes the fuel regulator 414 for modifying the fuel injection rate of the fuel injection member 92. For example, the fuel regulator 414 may be configured to modify a fuel injection rate of the second set of fuel nozzles 96 relative to a fuel injection rate of the first set of fuel nozzles 94 so that the fuel injection rate of the second set of fuel nozzles 96 is greater than the fuel injection rate of the first set of fuel nozzles 94. In such a manner, the fuel regulator 414 may be configured to control the fuel injection rates of the first and second sets of fuel nozzles 94, 96 such that more energy is inputted into the combustion gasses from the second set of fuel nozzles 96 as compared to the first set of fuel nozzles 94, such that the fuel injection member 92 generates higher temperature combustion gasses within the hot zone 102 as compared to within the cold zone 100. Notably in other operating conditions, the fuel regulator 414 may be configured to control the fuel injection rates of the first and second sets of fuel nozzles 94, 96 such that substantially the same amount of energy is inputted into the combustion gasses from the second set of fuel nozzles 96 as compared to the first set of fuel nozzles 94 to have a more uniform temperature distribution (i.e., not define separate hot zones 102 and cold zones 100).

Figure 7:
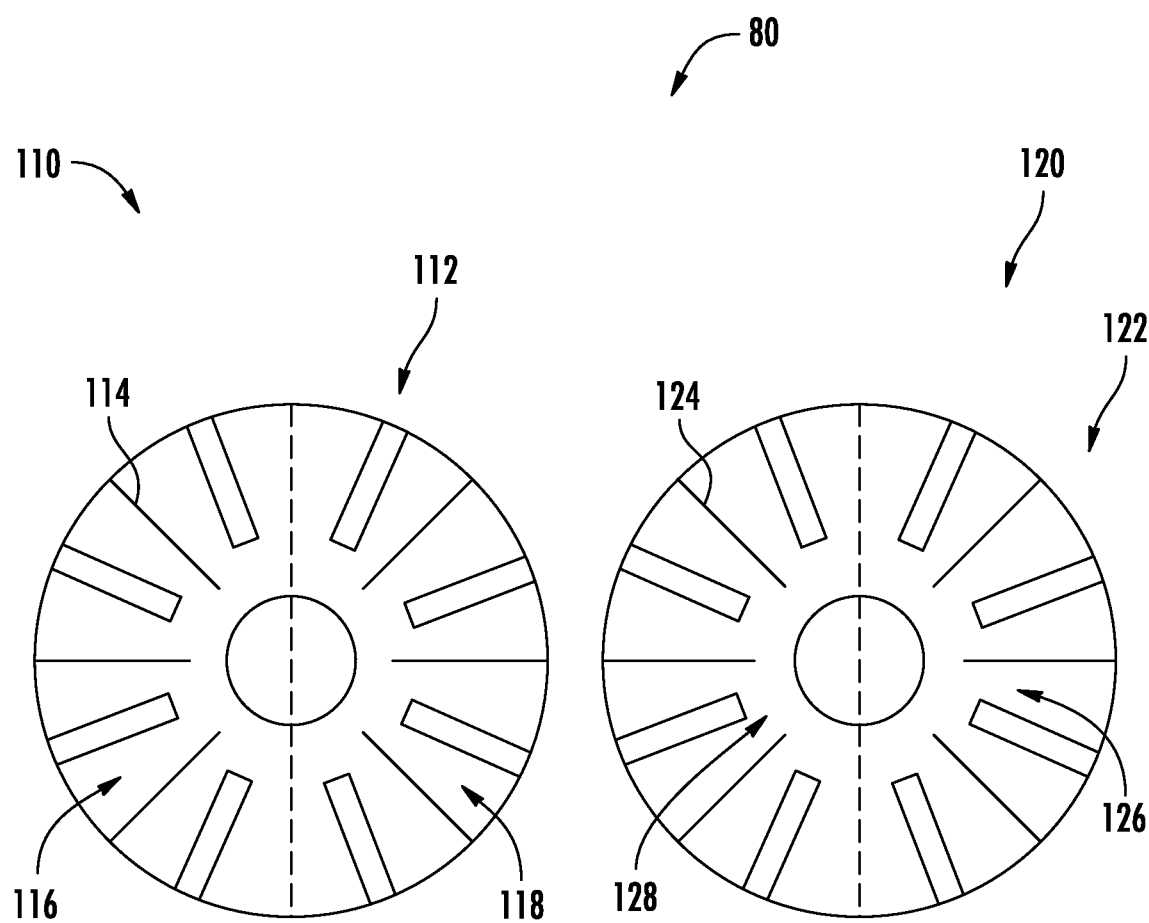
FIG. 7 is a simplified schematic view of a first afterburner assembly and a second afterburner assembly in accordance with an exemplary embodiment of the present disclosure.

Referring now to FIG. 7, a schematic view of an afterburner assembly 80 of a propulsion system in accordance with another exemplary aspect of the present disclosure is provided. The exemplary afterburner assembly 80 includes a first afterburner assembly 110 and a second afterburner assembly 120. The first afterburner assembly 110 includes a first fuel injector assembly 112. Further the first fuel injector assembly 112 includes a first plurality of fuel injection members 114. The first plurality of fuel injection members 114 defining a cold zone 116 and a hot zone 118 of the first afterburner assembly 110. Moreover, the second afterburner assembly 120 includes a second fuel injector assembly 122. The second fuel injector assembly 122 including a second plurality of fuel injection members 124. The second plurality of fuel injection members 124 defining a cold zone 126 and a hot zone 128 of the second afterburner assembly 120. In the exemplary embodiment, the second afterburner assembly 120 may provide additional thrust for propulsion system. The additional thrust may result in additional external noise produced by the afterburner assembly 80. The cold zone 116 of the first afterburner assembly 110 and the cold zone 126 of the second afterburner assembly 120 provide a noise insulation barrier for the afterburner assembly 80.

For example, the hot zone 118 of the first afterburner assembly 110 and the hot zone 128 of the second afterburner assembly 120 are adjacent such that the hot zone 118 of the first afterburner assembly 110 is facing the second afterburner assembly 120 and such that the hot zone 128 of the second afterburner assembly 120 is facing the first afterburner assembly 110. More specifically, the hot zone 118 and the hot zone 128 create noise insulation barriers for each other, i.e., the adjacent hot zones 118, 128 may refract and absorb sound waves from one another produced during operation. Further, the cold zone 116 of the first afterburner assembly 110 is positioned beside the hot zone 118 of the first afterburner assembly and the cold zone 126 of the second afterburner assembly 120 is positioned beside the hot zone 128 of the second afterburner assembly 120 such that cold zone 116 and cold zone 126 provide a noise insulation barrier for hot zone 118 and hot zone 128. The cold zones 116, 126 may make up at least an outer 20% of the afterburner assemblies 80 in the crosswise plane depicted, such as at least an outer 30%, and up to an outer 60%. Inclusion of an afterburner assembly 80 in accordance with such configuration may reduce the noise produced by the afterburner assembly 80 during an operating condition of the propulsion system.

It should be appreciated however, that in other exemplary embodiments of the present disclosure, the afterburner assembly 80 may additionally or alternatively include any other suitable configuration. For example, the first afterburner assembly 110 may have the cold zone 116 that is radially outward of the hot zone 118. Additionally, the second afterburner assembly 120 may have the cold zone 126 radially outward of the hot zone 128.

Figure 8:
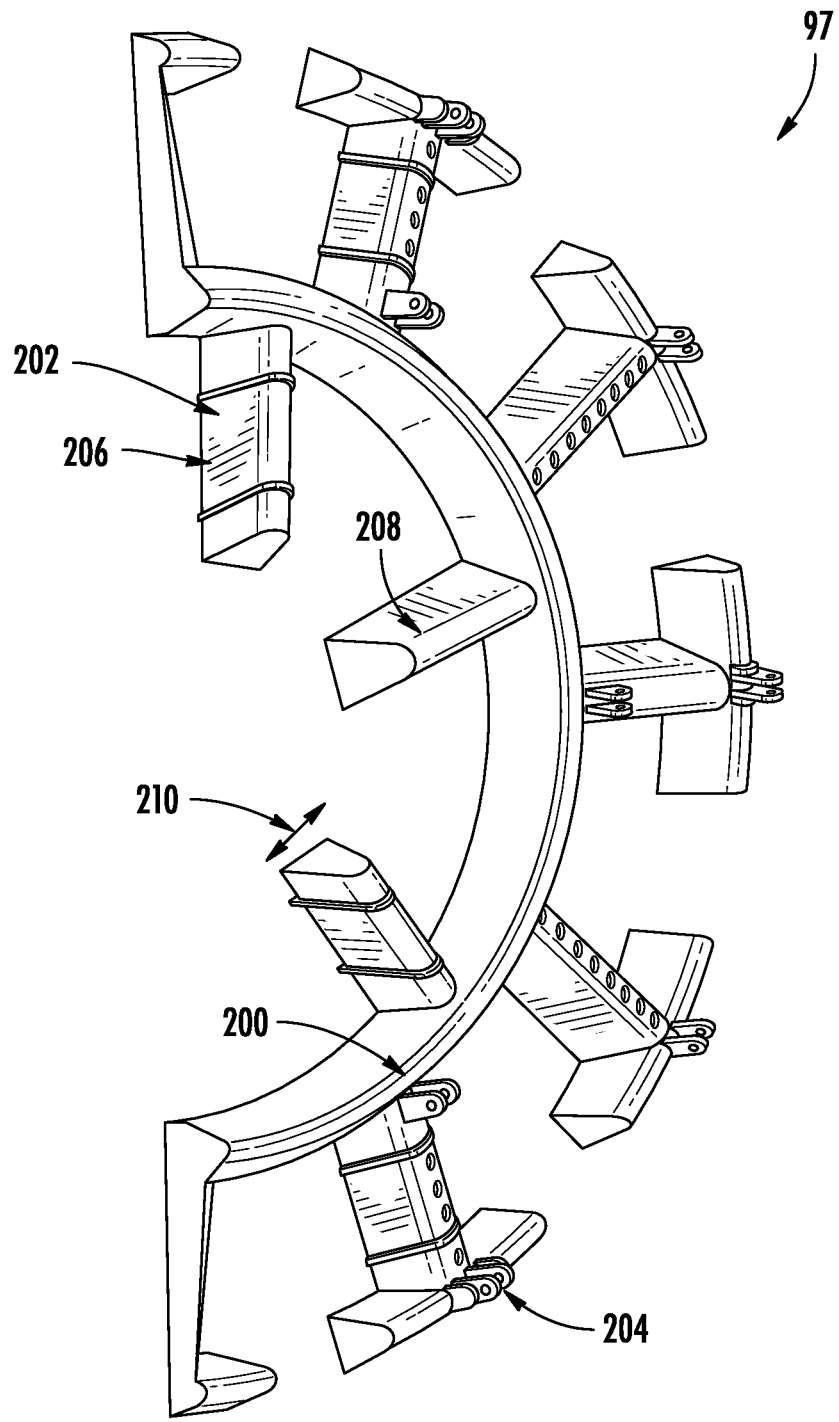
FIG. 8 is a partial perspective view of a flame stability device in accordance with an exemplary aspect of the present disclosure.

Referring now to FIG. 8, a partial perspective view of a flame stability device 97 in accordance with another exemplary aspect of the present disclosure is provided. More specifically, the flame stability device 97, which is disposed downstream of the plurality of fuel injection members 92 (not shown), of the exemplary embodiment is a v-gutter flame holder used to maintain continual combustion in the exhaust zone of the afterburner assembly 80.

More specifically, the flame stability device 97 includes a central ring 200. The central ring 200 including a plurality of inner radial gutters 202 and a plurality of outer radial gutters 204. The plurality of inner radial gutters 202 and the plurality of outer radial gutters 204 include a side wall 206, a leading edge 208, and a wake region. Each of the plurality of inner radial gutters 202 and a plurality of radially outer gutters define a generally V-shaped cross section. The apex of the V facing upstream towards the turbomachine 30, with the V being open in the downstream direction for performing the typical flame stability device 97 function.

It should be appreciated however, that in other exemplary embodiments of the present disclosure, the flame stability device 97 may additionally or alternatively include any other suitable configuration. For example, the flame stability device 97 may be a h-gutter flame holder, a ring flame holder, or a plurality of flame holders. Additionally, or alternatively, in other embodiments fuel injectors may be an integrated part of the flame stability device 97.

Figure 9:
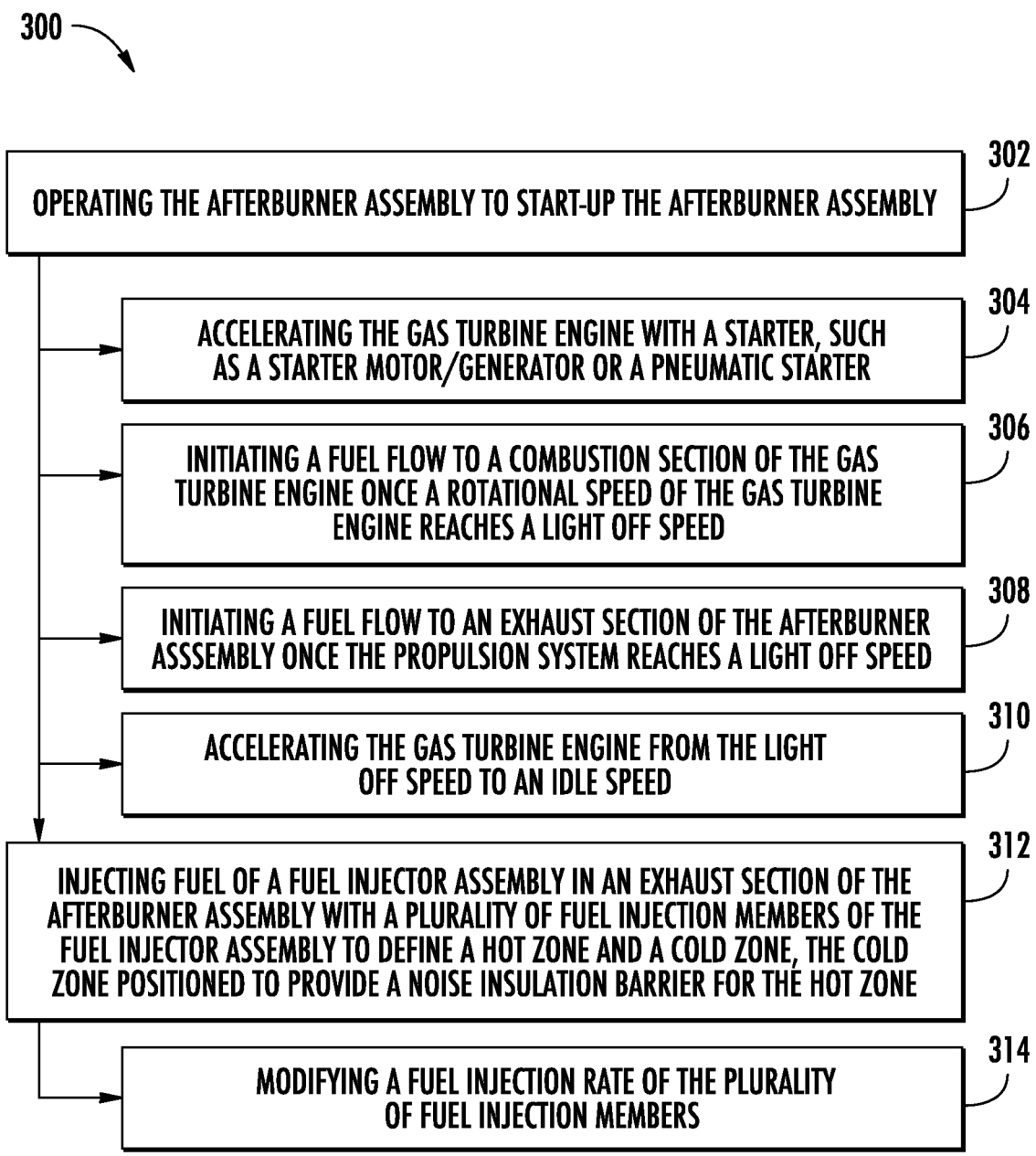
FIG. 9 is a flow diagram of a method of operating an afterburner assembly of a propulsion system in accordance with an exemplary embodiment of the present disclosure.

Referring now to FIG. 9, a flow diagram of a method 300 for operating an afterburner assembly 80 of a propulsions system is provided. In at least certain exemplary embodiments, the method 300 may be utilized to operate one or more of the exemplary afterburner assemblies 80 described above with reference to FIGS. 1 through 8. For example, the afterburner assembly 80 may generally include a fuel injector assembly 90 and define a hot zone 102 and a cold zone 100. Additionally, the method 300 may be implemented by one or more controllers, such as using the computing system 400 depicted in FIG. 10 and described below.

The method 300 generally includes at (302) operating the afterburner assembly to start-up the afterburner assembly. Operating the afterburner assembly to start up the afterburner assembly at (302) may include at (304) accelerating the gas turbine engine with a starter, such as a starter motor/generator or a pneumatic starter; at (306) initiating a fuel flow to a combustion section of the gas turbine engine once a rotational speed of the gas turbine engine reaches a light off speed; at (308) initiating a fuel flow to an exhaust section of the afterburner assembly once the propulsion system reaches a light off speed and at (310) accelerating the gas turbine engine from the light off speed to an idle speed.

The method 300 additionally includes at (312) injecting fuel of a fuel injector assembly in an exhaust section of the afterburner assembly with a plurality of fuel injection members of the fuel injector assembly to define a hot zone and a cold zone; the cold zone positioned to provide a noise insulation barrier for the hot zone. More particularly for the exemplary aspect depicted, injecting fuel of the fuel injector assembly in the exhaust section of the afterburner assembly includes at (314) modifying a fuel injection rate of the plurality of fuel injection members. For the exemplary aspect of FIG. 9 the cold zone is positioned to provide a noise insulation barrier for the hot zone. For example, modifying the injection rate of the fuel injection member 92 may include modifying the flow rate of fuel, modifying the size of the first set of fuel nozzles 94, modifying the size of the second set of fuel nozzles 96, or any other suitable modification thereof.

Operating an afterburner assembly 80 in accordance with one or more these exemplary aspects may reduce the external noise production of the afterburner assembly 80.

Figure 10:
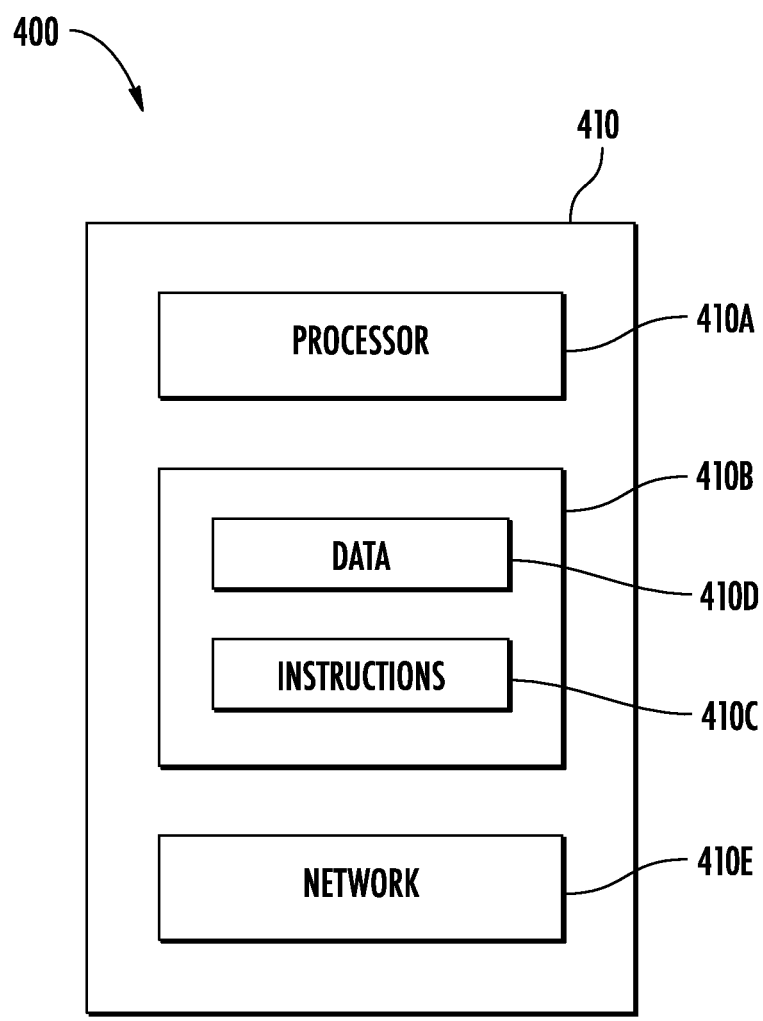
FIG. 10 is a block diagram of one embodiment of an exemplary controller that may be used within fuel injection member of FIG. 5.

Referring now to FIG. 10, an example computing system 400 according to example embodiments of the present disclosure depicted. The computing system 400 can be used, for example, as a controller of a fuel injection member 92. The computing system 400 can include one or more computing device(s) 410. The one or more computing device(s) 410 can include one or more processor(s) 410A and one or more memory device(s) 410B. The one or more processor(s) 410A can include any suitable processing device, such as a microprocessor, microcontroller, integrated circuit, logic device, and/or other suitable processing device. The one or more memory device(s) 410B can include one or more computer-readable media, including, but not limited to, non-transitory computer-readable media, RAM, ROM, hard drives, flash drives, and/or other memory devices.

The one or more memory device(s) 410B can store information accessible by the one or more processor(s), including computer-readable instructions 410C that can be executed by the one or more processor(s). The instructions 410C can be any set of instructions 410C that when executed by the one or more processor(s), cause the one or more processor(s) 410A to perform operations. In some embodiments, the instructions 410C can be executed by the one or more processor(s) 410A to cause the one or more processor(s) 410A to perform operations, such as any of the operations and functions for which the controller and/or the computing device(s) 410 are configured, the operations for operating an afterburner assembly 80 (e.g., method 300), as described herein, and/or any other operations or functions of the one or more computing device(s) 410. The instructions 410C can be software written in any suitable programming language or can be implemented in hardware. Additionally, and/or alternatively, the instructions 410C can be executed in logically and/or virtually separate threads on processor(s) 410A. The memory device(s) 410B can further store data 410D that can be accessed by the processor(s) 410A. For example, the data 410D can include data indicative of power flows, data indicative of engine/aircraft operating conditions, and/or any other data and/or information described herein.

The computing device(s) 410 can also include a network interface 410E used to communicate, for example, with the other components of a fuel injection member, afterburner assembly, propulsion system, etc. (e.g., via a communication network) such as one or more fuel regulator 414 (FIG. 6). The network interface 410E can include any suitable components for interfacing with one or more network(s), including for example, transmitters, receivers, ports, controllers, antennas, and/or other suitable components. One or more devices can be configured to receive one or more commands from the computing device(s) 410 or provide one or more commands to the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

It should be appreciated that the afterburner assembly of the propulsion system of the present disclosure may augment previously employed afterburner assemblies. The afterburner assembly may advantageously reduce the external noise produced while maintaining performance of the propulsion system as described above.

Further aspects are provided by the subject matter of the following clauses:

A propulsion system comprising: an afterburner assembly comprising: an exhaust section; and a fuel injector assembly operable for injecting a fuel in the exhaust section, the fuel injector assembly comprising a plurality of fuel injection members defining a hot zone and a cold zone, the cold zone positioned to provide a noise insulation barrier for the hot zone.

The propulsion system of any preceding clause, wherein the cold zone is radially outward of the hot zone.

The propulsion system of any preceding clause, wherein the hot zone is above the cold zone in a vertical direction of the afterburner assembly.

The propulsion system of any preceding clause, wherein the fuel injector assembly is operable to modify a fuel injection rate of the plurality of fuel injection members.

The propulsion system of any preceding clause, wherein the plurality of fuel injection members comprises a first fuel injection member, the first fuel injection member comprising a first set of fuel nozzles and a second set of fuel nozzles, the first set of fuel nozzles positioned in the cold zone, the second set of fuel nozzles positioned in the hot zone, and wherein the fuel injector assembly is operable to control a fuel injection rate of the first set of fuel nozzles relative to a fuel injection rate of the second set of fuel nozzles.

The propulsion system of any preceding clause, wherein the fuel injector assembly further comprises a flame stability device.

The propulsion system of any preceding clause, wherein the flame stability device is at least one of a v-gutter flame holder, h-gutter flame holder, ring flame holder, or a plurality of flame holders.

The propulsion system of any preceding clause, wherein the flame stability device is positioned downstream of the plurality of fuel injection members.

The propulsion system of any preceding clause, wherein the afterburner assembly is a first afterburner assembly, wherein the fuel injector assembly is a first fuel injector assembly, wherein the plurality of fuel injection members is a first plurality of fuel injection members, wherein the propulsion system further comprises a second afterburner assembly having a second fuel injector assembly, wherein the second fuel injector assembly comprises a second plurality of fuel injection members defining a hot zone and a cold zone.

The propulsion system of any preceding clause, wherein the cold zone of the second afterburner assembly is positioned to provide a noise insulation barrier for the hot zone of the second afterburner assembly.

The propulsion system of any preceding clause, wherein the hot zone of the first afterburner assembly and the hot zone of the second afterburner assembly are adjacent.

The propulsion system of any preceding clause, wherein the fuel injector assembly defines a first average temperature within the cold zone during an operating condition of the propulsion system, wherein the fuel injector assembly defines a second average temperature within the hot zone during the operating condition of the propulsion system, and wherein the first average temperature is at least 10% lower than the second average temperature.

The propulsion system of any preceding clause, further comprising: a turbomachine located upstream of the afterburner assembly and defining an axial direction, wherein the propulsion system defines a crosswise plane perpendicular to the axial direction, and wherein the hot zone and the cold zone are defined in the crosswise plane.

A method of operating an afterburner assembly of a propulsion system, the method comprising: operating the afterburner assembly to start-up the afterburner assembly; and injecting fuel of a fuel injector assembly in an exhaust section of the propulsion system with a plurality of fuel injection members of the fuel injector assembly to define a hot zone and a cold zone, the cold zone positioned to provide a noise insulation barrier for the hot zone.

The method of any preceding clause, wherein the cold zone is radially outward of the hot zone.

The method of any preceding clause, wherein the hot zone is above the cold zone in a vertical direction of the afterburner assembly.

The method of any preceding clause, wherein injecting fuel of the fuel injector assembly in the exhaust section of the propulsion system comprises modifying a fuel injection rate of the plurality of fuel injection members.

The method of any preceding clause, wherein the plurality of fuel injection members comprises a first set of fuel nozzles and a second set of fuel nozzles, the first set of fuel nozzles in the cold zone, the second set of fuel nozzles in the hot zone, and wherein the fuel injector assembly is operable to control a fuel injection rate of the first set of fuel nozzles relative to a fuel injection rate of the second set of fuel nozzles.

The method of any preceding clause, wherein the fuel injector assembly further comprises a flame stability device.

The method of any preceding clause, wherein the flame stability device is at least one of a v-gutter flame holder, h-gutter flame holder, ring flame holder, a plurality of flame holders, or any other suitable configuration of a flame holder.

What is claimed is:

1. A propulsion system comprising:
a turbomachine; and
an afterburner assembly disposed downstream of the turbomachine, the afterburner assembly comprising:
an exhaust section; and
a fuel injector assembly positioned within the exhaust section, the fuel injector assembly comprising a plurality of fuel injection members and a flame stability device, the plurality of fuel injection members each spaced circumferentially apart, each fuel injection member extending radially inward, the plurality of fuel injection members each operable for injecting fuel in the exhaust section, wherein during operation in a full thrust condition of the propulsion system and the plurality of fuel injection members a hot zone and a cold zone are defined by an injection rate of the fuel into the exhaust section via the plurality of fuel injection members, wherein the cold zone is positioned radially outward of the hot zone, wherein during operation of the propulsion system and the plurality of fuel injection members a noise insulation barrier for the hot zone is provided by the cold zone, wherein during operation in the full thrust condition, the cold zone radially shields noise generated by the hot zone thereby reducing external noise produced by the afterburner assembly, wherein the fuel injector assembly is operable to modify a fuel injection rate of the plurality of fuel injection members, wherein the flame stability device comprises a first flame stability device positioned downstream of the plurality of fuel injection members and a second flame stability device positioned downstream of the plurality of fuel injection members, and wherein the first flame stability device has a first configuration and the second flame stability device has a second configuration different than the first configuration.

2. The propulsion system of claim 1, wherein the flame stability device includes a central ring having a plurality of inner radial gutters and a plurality of outer radial gutters, wherein the plurality of inner radial gutters and the plurality of outer radial gutters each include a side wall, a leading edge, and a wake region, and wherein each of the plurality of inner radial gutters and each of the plurality of outer radial gutters define a generally V-shaped cross section.

3. The propulsion system of claim 2, wherein the plurality of fuel injection members comprises a first fuel injection member, the first fuel injection member comprising a first set of fuel nozzles and a second set of fuel nozzles, the first set of fuel nozzles positioned in the cold zone, the second set of fuel nozzles positioned in the hot zone, wherein the fuel injector assembly is operable to control a fuel injection rate of the first set of fuel nozzles relative to a fuel injection rate of the second set of fuel nozzles, and wherein the second set of fuel nozzles are larger than the first set of fuel nozzles.

4. The propulsion system of claim 2, wherein the first flame stability device and the second flame stability device each include a v-gutter flame holder, h-gutter flame holder, ring flame holder, or a plurality of flame holders.

5. The propulsion system of claim 1, wherein the afterburner assembly is a first afterburner assembly, wherein the fuel injector assembly is a first fuel injector assembly, wherein the plurality of fuel injection members is a first plurality of fuel injection members, wherein the propulsion system further comprises a second afterburner assembly having a second fuel injector assembly, wherein the second fuel injector assembly comprises a second plurality of fuel injection members defining a hot zone and a cold zone.

6. The propulsion system of claim 5, wherein the cold zone of the second afterburner assembly is positioned to provide a noise insulation barrier for the hot zone of the second afterburner assembly.

7. The propulsion system of claim 5, wherein the hot zone of the first afterburner assembly and the hot zone of the second afterburner assembly are adjacent.

8. The propulsion system of claim 1, wherein the fuel injector assembly defines a first average temperature within the cold zone during an operating condition of the propulsion system, wherein the fuel injector assembly defines a second average temperature within the hot zone during the operating condition of the propulsion system, and wherein the first average temperature is at least 10% lower than the second average temperature.

9. The propulsion system of claim 1, wherein the propulsion system defines an axial direction,
wherein the propulsion system defines a crosswise plane perpendicular to the axial direction, and wherein the hot zone and the cold zone are defined in the crosswise plane.

* * * * *